July 10, 1956  W. FELENCHAK  2,753,617
ADJUSTABLE CENTERING SPRING THREADING TOOL HOLDER
Filed Feb. 4, 1953
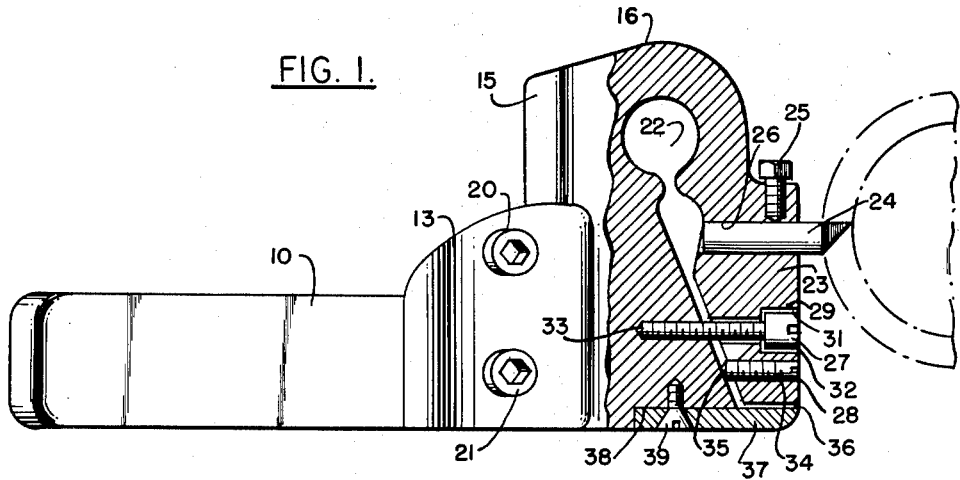
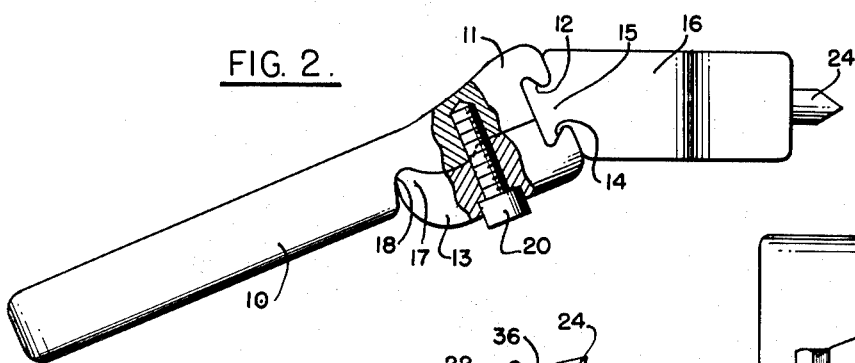
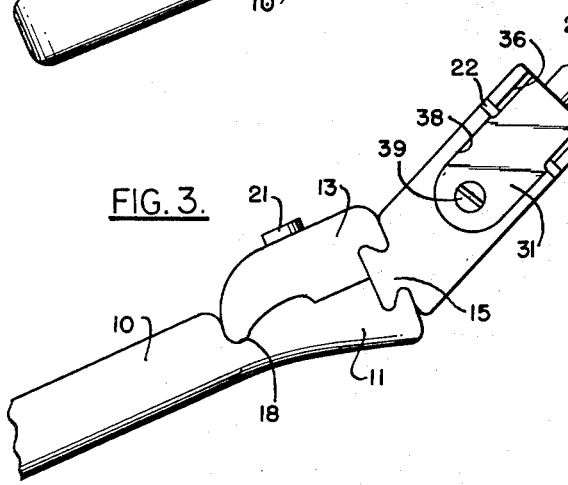
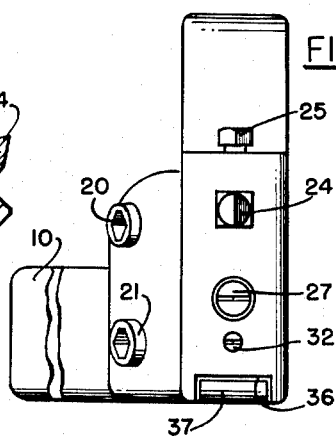
INVENTOR
WILLIAM FELENCHAK

2,753,617

ADJUSTABLE CENTERING SPRING THREADING TOOL HOLDER

William Felenchak, Ansonia, Conn.

Application February 4, 1953, Serial No. 335,021

1 Claim. (Cl. 29—97.5)

This invention relates to an adjustable centering spring threading tool holder.

It is an object of the present invention to provide a threading tool holder for a tool bit which can be adjusted to have the bit on dead center without having to disengage or tilt the tool bit holder, as is done by a rocker underneath the tool bit in the standard tool post.

It is another object of the invention to provide a threading tool holder wherein the clearances of the cutting tool bit will not be made less or greater and thereby eliminate the need for regrinding and resetting the cutting tool bit when being in continued use.

Other objects of the invention are to provide an adjustable centering spring thread tool holder, having the above objects in mind, which is of simple construction, inexpensive to manufacture, has a minimum number of parts, may be used in any type of screw cutting lathe, easy to adjust, durable with long life, compact, convenient to use and efficient in operation.

For other objects and for a better understanding of the invention, reference may be had to the following detailed description taken in connection with the accompanying drawing, in which:

Figure 1 is an elevational view of the adjustable centering spring threading tool holder with portions of the same broken away to show the interior construction thereof;

Fig. 2 is a top plan view of the tool holder of the present invention with portions broken away to show the connection of the clamping screws with the clamping parts;

Fig. 3 is a bottom plan view;

Fig. 4 is an end elevational view looking upon the tool bit and upon the heads of the adjusting screws.

Referring now to the figures, 10 represents the attaching bar portion of the tool holder. This bar portion is adapted to extend into the slot of the tool post. The forward end of the bar portion has an enlargement 11 with a vertically extending partial keyway slot 12 therein. Adapted to be attached to the side of this enlargement 11 is a clamping plate 13 having a partial keyway slot 14 which will match or be aligned with the keyway slot 12 of the enlargement 11 to provide a vertically extending dovetail slot for receiving a dovetail portion 15 of tool bit holder member 16. The clamping plate 13 has a vertically extending rounded portion 17 which will be fitted into a recess 18 on the bar portion 10. Clamping screws 20 and 21 are vertically spaced from each other and extend through the clamping plate 13 to fix it securely in flush engagement with the enlargement 11 of the bar portion 10 whereby to close the dovetail portion 14 of the clamp upon the dovetail portion or projection 15 of the spring threading tool bit member 16.

It will now be seen that with the bar attaching portion 10 in place on the tool post there will be no need for adjustment of the same or release of it from the tool post to obtain a vertical adjustment of the tool bit holder member 16. This can be readily done by the single screws 20 and 21 and the plate 13. Thereafter the plate 13 will be tightly secured to the enlarged portion 11 so as to fix the member 16 in its adjusted position.

The tool bit member 16 has a spring slot 22 that extends downwardly and forwardly to provide a spring tool bit holding portion 23 in which tool bit 24 is made secure by a set screw 25. The tool bit lies in a horizontal hole 26 and when once adjusted, its pointed end should be extended to the work piece and preferably on a dead center elevation.

To adjust the cutting bit and place it on dead center after the member 16 has been vertically aligned, this is done by adjusting screws 27 and 28. Hole 29 is oversized and through this extends the screw 27. The hole 29 has a counterbored portion 31 to receive head 32 of the screw 27. The screw enters a threaded hole 33 in the main portion of the member 16. Since the hole 29 is oversize, portion 23 can be adjusted to be sprung in or to be sprung outwardly.

The screw 28 is adjustable in a threaded hole 34 in the portion 23 and its end 35 may engage with a space of the slot 22. The spring action of the portion 23 is thus controlled by the two screws 27 and 28. The screw 27 can be tightened to cause the tool bit to be slightly dipped and by tightening the screw 28 the adjustment of the portion 23 will be retained.

In order to prevent the tool bit from weaving sideways, the lower end of the portion 23 is provided with an oversize and somewhat exaggeratedly shown slot 36 into which extends a tongue 37 fixed in a bottom recess 38 of the main body of the member 16 by screw 39. The tongue 37 is tight fitted in the recess 38 and the screw has a bevel head. The portion 23 and the tool bit 24 can thus weave sideways slightly in order to prevent breakage of the tool point. The pointed end of the tool bit can be either round or square, depending upon the thread being cut.

It should now be apparent that there has been provided a tool bit holder which is much easier to adjust in order to have the tool bit on dead center than is the standard conventional thread tool bit holder.

While various changes may be made in the detail construction, it shall be understood that such changes shall be within the spirit and scope of the present invention, as defined by the appended claim.

What is claimed is:

An adjustable centering spring tool holder having a vertically-slit spring member with a slit vertically-extending from the lower side of the member to the interior thereof and thereby providing a spring portion and a main body portion, vertically-extending keyway means on the main body portion, a shank member having cooperating keyway means for receiving the keyway means of the main body portion, a clamp plate on the shank member having cooperating keyway means for engaging the keyway means of the main body portion, and clamping screws for securing the clamping plate to the shank member, said shank member being adapted to attach the holder to a tool post of a lathe, said spring portion of the spring member having a horizontal opening therein adapted to receive a tool bit, set screw means on the spring portion for fixing the tool bit in the horizontal opening, parallel holes lying one above the other and below the tool bit and within the spring portion, the uppermost hole being smooth and a threaded adjusting screw extending through the upper opening and threadedly engaging the main portion and adapted to hold the spring portion in its inwardly adjusted position, the diameter of the adjusting screw being less than the diameter to allow for free movement of the spring portion, the lower hole in the spring portion being threaded and a set screw in the threaded hole and engaging with the main portion and adjustable to hold the spring portion expanded from the main portion the lower end of said spring portion having oversize slot therein, the tongue releaseably secured to the main portion and extending into the slot in the lower end of the spring portion thereby permitting within the midst slight sideways of the spring portion relative to the main portion to thereby permit breakage of the tool bit point.

References Cited in the file of this patent

UNITED STATES PATENTS

| | | |
|---|---|---|
| 932,576 | Ramsey | Aug. 31, 1909 |
| 1,214,225 | Schillberg | Jan. 30, 1917 |
| 1,416,832 | Johansson | May 23, 1922 |
| 1,458,633 | Vokal | June 12, 1923 |
| 2,448,586 | Gile | Sept. 7, 1948 |
| 2,499,529 | Schlitters | Mar. 7, 1950 |